United States Patent [19]

Binzen

[11] Patent Number: 4,760,968

[45] Date of Patent: Aug. 2, 1988

[54] INTEGRATED DUST CONTAINMENT SYSTEM FOR ROTARY CRUSHER/BREAKERS AND THE LIKE

[75] Inventor: Willard Binzen, Gibsonia, Pa.

[73] Assignee: Dravo Corporation, Pittsburgh, Pa.

[21] Appl. No.: 68,650

[22] Filed: Jun. 30, 1987

[51] Int. Cl.⁴ .............................................. B02C 19/00
[52] U.S. Cl. ................................... 241/101.2; 55/302
[58] Field of Search ........................ 55/302; 241/101.2

[56] References Cited

U.S. PATENT DOCUMENTS

| | | |
|---|---|---|
| 3,477,650 | 11/1969 | Williams . |
| 3,490,207 | 1/1970 | Sare ................................... 55/302 X |
| 3,499,267 | 3/1970 | King et al. ......................... 55/302 X |
| 4,002,301 | 1/1977 | Shurtleff . |
| 4,318,512 | 3/1982 | Jacobson et al. . |
| 4,525,184 | 6/1985 | Tassicker ............................... 55/302 |
| 4,641,789 | 2/1987 | Moscardini ........................... 241/31 |

Primary Examiner—Mark Rosenbaum
Attorney, Agent, or Firm—Parmelee, Miller, Welsh & Kratz

[57] ABSTRACT

An integrated dust containment system for machines such as rotary crusher/breakers, vibratory screens and the like of the type use in sizing dusty bulk materials, such as for coal, ore and the like. A substantially airtight enclosure having integral air filter means and fan means is detachably fitted to the machine housing adjacent the material treating station such that the air filter means is in communication with the dust generation area of the machine. A negative draft generated by the fan means draws in dust laden air from inlet and discharge zones of the machine, as well as from the material treating station for capture of the dust in the filter means and susequent discharge of clean, filtered air from the fan means. Pulsed, compressed air back flushing of the filter means cleans the filters and returns the collected dust cake to the machine interior for subsequent recovery.

11 Claims, 3 Drawing Sheets

INTEGRATED DUST CONTAINMENT SYSTEM FOR ROTARY CRUSHER/BREAKERS AND THE LIKE

BACKGROUND OF THE INVENTION

The present invention relates generally to the control of airborne particulates and, more particularly, to the containment and collection of fugitive dust emissions generated by industrial processing equipment such as rotary crusher/breakers, vibratory screens, and like bulk material sizing and classifying machinery.

Over the past years, much attention has been given to cleaning-up the environment, with particular emphasis being placed on the abatement of air pollution in the industrial segment. Many problems have been encountered in attempting to design and place air pollution control equipment on process equipment which is already in place within a facility. In addition, heavy duty sizing equipment in use in high volume bulk material handling systems, such as rotary crusher/breakers, vibratory screens and the like, are of established, time tested designs which are purchased in an unmodified state and installed in a conventional fashion. Heretofore, in order to control dust emissions generated by such conventional equipment, either as a retrofit of an existing installation or in a new installation, it has been common practice to provide dust collection pick-up stations in the chute work and transfers upstream and downstream of the crusher/breaker or screening equipment. These known dust collection pick-up stations generally comprise ductwork installed in the feed chute of the equipment, take-away chutes and transfers. This extensive ductwork then transports the dust to a remotely located dust collector/air filter installation. A negative draft is induced therein by way of conventional fan means. The collected dust cake is periodically cleaned from the filters and later returned to the product flow. These conventional dust collection systems are quite costly in that they usually require separate building structures and sturdy foundations to support the relatively large dust collection equipment. Voluminous quantities of air are also required to transport the dust laden air to the remotely located collectors. This, in addition to the accompanying duct pressure losses, produces high horsepower fan requirements resulting in high capital and high operating expenses. It is also observed that dust particles generated in this type of operation, such as coal or ore dusts, are highly erosive to the inside diameters of the ductwork and pipes causing noticeable wear in a relatively short time which requires additional expense. Constant maintenance and adjustment are required on the balance systems, rotary valves, dust return conveying systems and interlock controls in these conventional air pollution control installations.

The present invention solves many of the problems heretofore associated with the containment, capture and recovery of fugitive dust generated by rotary crusher/breakers, vibratory screens and the like equipment. The invention provides an integrated dust containment system for such equipment which eliminates the need for ductwork to transport the dust to remote collectors. The dust containment system of the present invention provides for the capture of fugitive dust particles within the confines of the equipment housing and then periodically returns it to the dust generation area within the machine housing. Hence, fugitive dust never leaves the dust generation site. It can be readily appreciated that the present invention requires less air to capture the dust than prior systems. In addition less horsepower is required since there are no duct losses and transport velocity requirements as in prior dust collection arrangements.

SUMMARY OF THE INVENTION

The above-described desirable features and advantages of the present invention are achieved in an efficient and economical manner. The present invention provides an integrated dust containment system for the control, capture and recovery of fugitive product dust generated by commercial crusher/breakers, vibratory screens and like bulk material sizing machines. Briefly stated, the invention comprises an airtight integral collector enclosure having a plurality of hollow filter elements mounted therein. The housing of the rotary crusher/breaker or vibratory screen or like machine, is penetrated and the aforementioned enclosure containing the dust collector filter elements is fitted thereto such that the filters are physically positioned in communication with, and preferably directly above, the dust generation area of the machinery. The integral collector enclosure which houses the array of filters is detachably fitted to the machine housing such that it can be easily lifted by a crane and removed therefrom if maintenance is required. Sufficiently sized fan means are provided adjacent the collector enclosure in communication with the interior portions of the hollow filter elements to cause an influx of air and entrained dust into the filter elements. The filtered air is then exhausted through appropriate ducting and released as clean air to the atmosphere. The collected dust cake which forms on the exterior surfaces of the array filters is periodically cleaned by compressed air back flushing and returned directly by gravity free fall to the machine interior for immediate recovery in the existing take-away equipment. The negative draft generated by the fan means is sufficient to cause a suction within the existing feed chutes and discharge chutes/hoppers from the surrounding air. In this manner, the incoming air drawn in by the dust collector fan creates a negative draft at all openings in the machine system and, thus, seals all such openings to prevent the escape of fugitive dust to the surrounding environment. The integral collector enclosure is constructed as a utilized structure such that it can be easily bolted to the machine housing and, likewise, relatively easily unbolted and lifted for removal by an overhead lifting crane for any required maintenance on the crusher/breaker cylinder drum or vibratory screens or like machinery within the housing. The peripheral edges connecting the integral collector enclosure and the machine housing preferably carry a rubber edging strip to bear against the machine housing to minimize uneven loading on the machine housing and also to improve the fit therebetween so as to increase fan efficiency. Structural beams and columns are attached to the collector enclosure and are adapted to support the weight of the enclosure and fan means on bearing surfaces other than the machine housing.

In another presently preferred embodiment of the invention, individual dust collector units, comprising sets of filter elements, each having an integral fan motor, for example, three such motorized collector units, are mounted within the integral collector enclosure. This modified integral collector enclosure is also adapted to be detachably mounted to the housing of the machine. The dust collector filter elements are also connected to a pulsed, compressed air jet back cleaning apparatus, as in the previous embodiment, to return the collected dust cake periodically to the dust generation area of the machine.

DETAILED DESCRIPTION OF THE INVENTION

Figure 1:
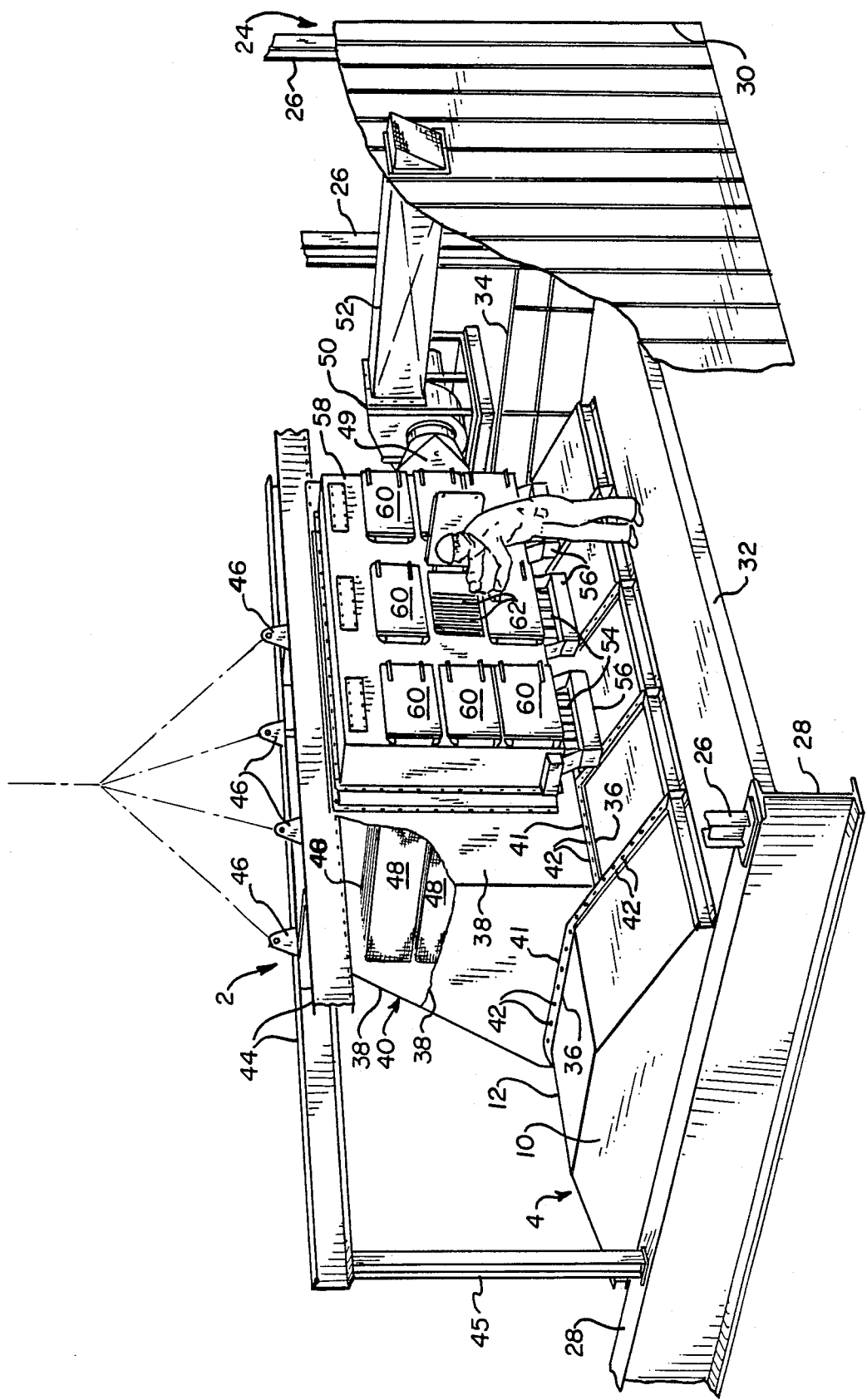
FIG. 1 is a partially fragmented, perspective view of a presently preferred embodiment of the invention in place on a top housing portion of a rotary crusher/breaker machine.
Figure 2:
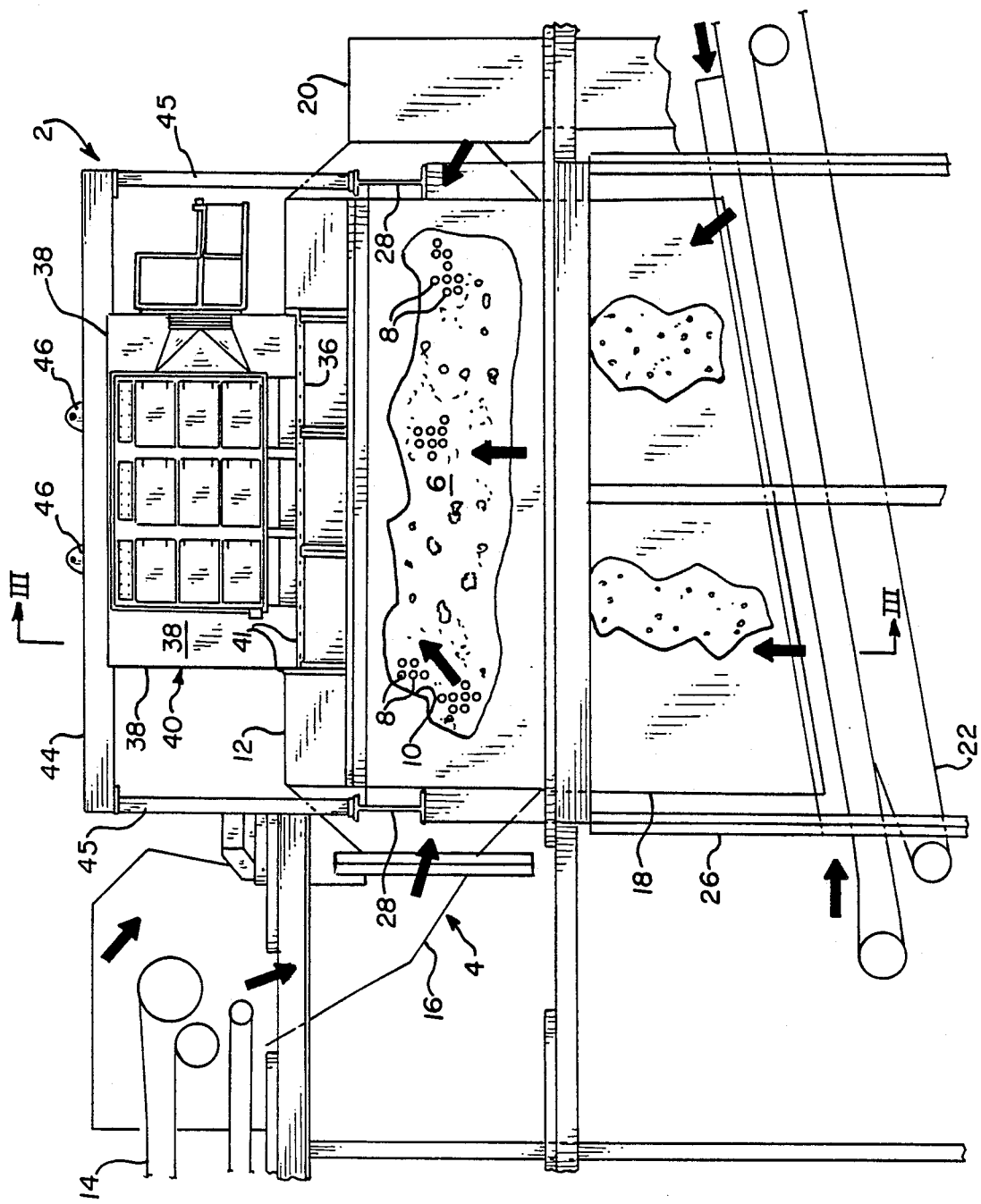
FIG. 2 is a side elevational view, partially fragmented, of the installation of FIG. 1, also showing the feed conveyor chute, breaker drum, hopper and discharge regions of the machine.
Figure 3:
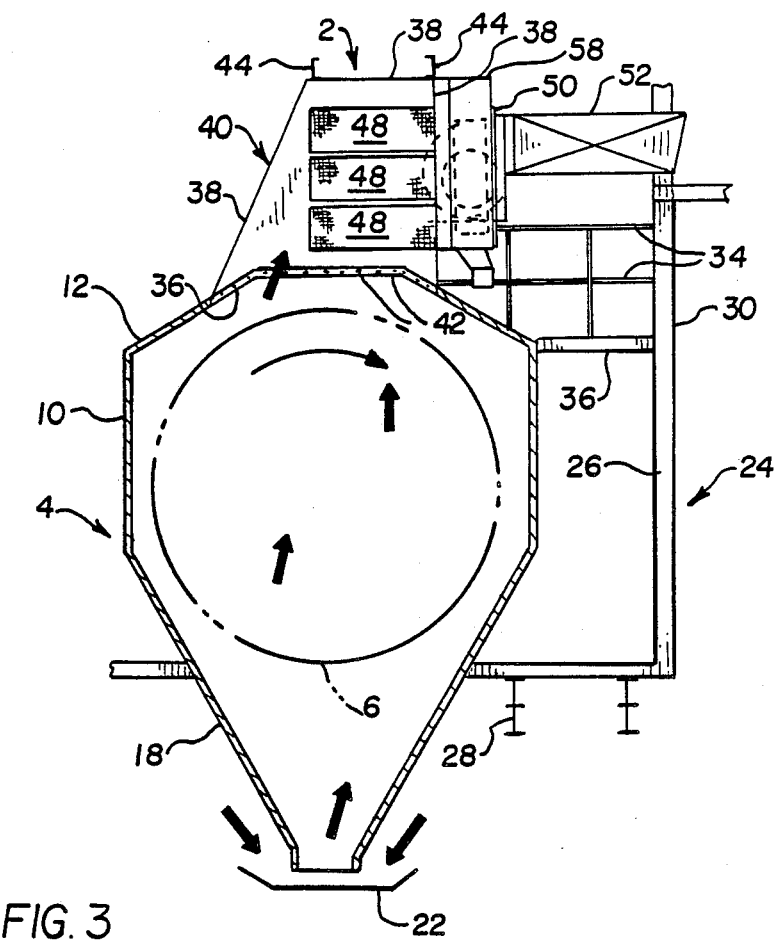
FIG. 3 is a cross-sectional end view of the installation taken along line III—III of FIG. 2.
Figure 4:
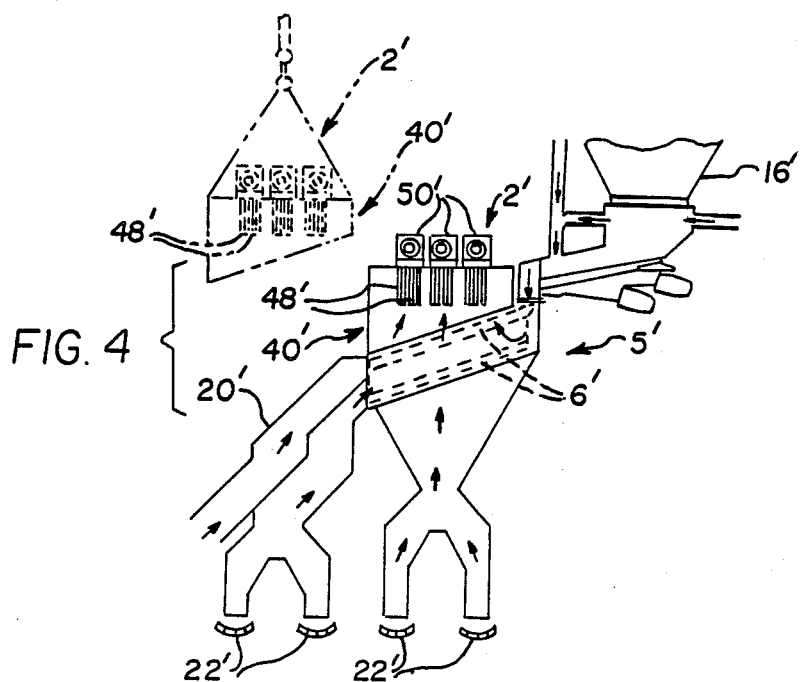
FIG. 4 is a reduced scale, schematic side view of another preferred embodiment of the invention in use on vibratory screening machine.

Referring now to the drawings, wherein like elements are designated by the same reference numerals throughout the various figures and similar elements by primed numerals, a presently preferred embodiment of the present invention, generally designated 2, is shown in place on a conventional rotary crusher/breaker 4 in FIGS. 1–3. Another embodiment of the present invention, designated 2', is shown in FIG. 4 in use on a conventional vibratory screening machine 1, which will be described in greater detail hereinafter following the description of the rotary crusher/breakers installation.

The rotary crusher/breaker 4 of FIGS. 1–3 is conventional in all respects and includes a rotatable cylindrical drum 6 having a plurality of sized holes 8 formed therein. The rotary drum 6 is enclosed by a stationary housing 10. Bulk material containing oversized lumps such as coal, ore products and like flowable material, is introduced to the crusher/breaker machine by a feed conveyor 14 which deposits the material into a feed chute 16 for delivery to an open end of rotary drum 6. The rotating action of the drum 6 causes the lumps within the bulk material to disintegrate upon continuous impacting action. The smaller sized particles pass through the holes 8 within the wall of the drum 6 and fall by gravity to a discharge hopper 18 therebelow and thence to one of several conventional, take-away conveyors 22.

Oversized lumps of material which are not reduced to proper size within the crusher/breaker drum 6 are discharged at chute 20 for delivery to one of the take-away conveyors 22 for further treatment and later recovery or reduced to proper size by rotating hammers within the crusher/breaker. It is, of course, recognized and readily observed in the course of sizing various dusty materials within the machine 4 that fugitive dust is continuously generated, not only within the rotating drum 6 but also at the several material dumping locations, such as at the feed conveyor 14, feed chute 16 and at the hopper 18, discharge chute 20 and take-away conveyors 22.

In accordance with the present invention, an integrated dust containment system 2 is installed at the upper housing portion 12 of the rotary crusher/breaker machine housing 10. The crusher/breaker machine 4, as seen in FIG. 1, is usually permanently installed within the protective confines of a building 24, comprising conventional structural elements such as vertical columns 26, horizontal beams 28 and exterior walls 30. A floor or platform 32 with a conventional safety railing 34 is installed adjacent the upper housing portion 12 of the machine 4 to provide convenient worker access to the dust containment system 2. In order to gain communication with the dust generation area at the interior of the machine 4, a section of machine housing 10, along a flanged edge seam 36 at the top housing portion 12, above the rotatable drum 6, is cut away. The dust containment system 2 is then fitted within the cut-out section.

The dust containment system 2 is enclosed on its sides and top by sheet metal walls 38 which define an airtight enclosure 40 having an open bottom edge 41 which is attached to the upper machine housing 12 along flanged edge 36 thereof. A rubber strip-type joint is preferably employed at the interface between the adjoining edges 36 and 41 to improve the fit between the components and to minimize uneven loading of the enclosure 40 on the machine housing 12. A plurality of threaded bolts 42 and nuts are used to attach the enclosure 40 along the overlapping edges 36 and 41. A pair of spaced apart horizontally extending C-beams 44 are attached to the top side of the enclosure 40 and are fitted with apertured brackets 46 to provide convenient crane lifting points to transport the system 2 to and from the machine 4. Four vertical columns 45 are attached at the respective ends of the C-beams 44 to support the weight of the system 2 on the building structure 24. As seen in FIGS. 1 and 2, the feet of the columns 45 supportingly bear against the horizontal I-beams 28 of the building. Thus, overloading of the machine housing 10 is minimized.

A plurality of air filter elements 48 are mounted within the enclosure 40 to capture the fugitive dust particles thereon and pass clean, filtered air to the environment. The array of filter elements 48 may be conventional and are preferably constructed of a synthetic fabric material, which forms an air permeable membrane, ideal for the dust containment function of the present invention. The filter elements 48 may be of a thin rectangular shape and are packed in closely stacked arrays, preferably three rows high as in FIGS. 1–3, and supported in a conventional framing structure. Tubular, or other shaped filter elements, could also be employed. The filter pad elements 48 each have hollow interiors supported on wire frames which communicate via a manifold 58 and duct 49 with an exhaust fan 50 which, in turn, creates a negative draft within the filters 48 to draw dust laden air to the interior of the enclosure 40. The fan 50 is attached to an appropriate exhaust duct 52 which expels the filtered, clean air to the atmosphere at the exterior of the building 24. A typical fan size for a crusher/breaker installation is on the order of about 15,000 cubic feet per minute.

The draft induced by fan 50 is sufficient to cause an influx of air, or negative draft, at the various dust generation points mentioned above, and to cause an overall air flow within and around the machine 4, as generally indicated by the arrows in FIGS. 2 and 3. In this manner, fugitive dust is not permitted to leave the dust generation areas of the machine, namely, at the drum 6, at the extremities of the machine at the conveyor 14, feed chute 16, at hopper 18, discharge chute 20 and about the take-away conveyors 22. The negative draft generated by the exhaust fan 50 causes an influx of air at the open extremities of machine 4 to prevent dust emissions therefrom. Thus, fugitive dust never leaves the dust generation areas of the machine 4. Hence, less air is required to capture the dust and less fan horsepower is needed since there is no long duct transport velocity requirement as heretofore necessitated by prior dust control systems.

The interiors of each of the filter pad elements 48 are also in communication with a source of compressed air which is periodically activated by control 54, including solenoid valves, to automatically inject a conventional jet pulse of compresed air from storage reservoir 56 into each of the filters. A suitable air compressor (not shown) supplies air to each of the reservoir tanks 56. The pulsed backflow of compressed air jets causes the accumulated dust cake on the exterior surfaces of each of the filters 48 to detach therefrom and fall by gravity into the drum area of the machine 4 for immediate recovery by the take-away conveyors 22.

The front wall 38 of the airtight collector enclosure 40 also includes the previously mentioned manifold panel 58. The manifold panel has an array of service doors 60 thereon to provide operator access to the interior of the enclosure 40, whereby periodic inspection, maintenance and replacement of the filter elements 48 may be carried out as needed.

The dust containment system 2' of FIG. 4 is shown schematically, on a reduced scale, in use with a conventional vibratory screening machine 5'. The airtight collector enclosure 40' is detachably fitted to the upper housing of the machine 5' above the duct generation area of the screens 6'. Self contained fan units 50' with individual arrays of filter elements 48' of a known design are fitted along the top wall of the enclosure 40' such that the filter elements 48' are in communication with the interior of the machine 5. The negative draft generated by the fans 50' causes an influx of air as indicated by the arrows, which prevents the escape of fugitive dust from the machine and its peripheral areas, such as at the inlet chute 16', oversize outlet chute 20' and the take-away conveyors 22'. The negative draft captures the dust particles and carries them to the filters 48' for capture thereby. Clean, filtered air is then exhausted by the fans 50' which may be ducted in a known manner to the building exterior (not shown). The filters 48' are also equipped with a pulsed jet, compressed air, back flushing means to provide periodic cleaning of the filters as previously described for the crusher/breaker embodiment. Dust cake so removed, falls by gravity from the filter elements 48' for subsequent recovery by the take-away conveyors 22'. As shown in FIG. 4, the containment enclosure 40' is also adapted to be lifted by a crane from the machine 5 in a manner similar to that previously discussed, to permit periodic or emergency maintenance on the screens 6' or the enclosure 40'.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

Having described the invention, what is claimed is:

1. In combination, a dust containment system and a machine for sizing dusty materials comprising;

a machine housing defining a closed interior region therewithin and having inlet and outlet means communicating therewith for the introduction and discharge, respectively, of bulk material, means positioned within the machine housing for treating and sizing said bulk material for delivery to said outlet means;

said dust containment system including a substantially airtight collector enclosure having an interior defined by vertical sidewalls and a closed top wall and having an open bottom, said enclosure detachably fitted to said machine housing wherein the interior of said collector enclosure is in communication with said machine interior adjacent said treating and sizing means;

a plurality of hollow filter elements mounted within the collector enclosure;

fan means associated with the enclosure including duct means communicating with the hollow interiors of each of said filter elements to create a negative draft within said enclosure and said machine interior when said fan means is activated to capture fugitive dust generated within said machine and deposit said dust on the filter elements; and back cleaning means associated with said collector enclosure and communicating with the hollow interiors of each of said filter elements to deliver periodic, pulsed jets of compressed air to said filter elements whereby, when activated, collected dust cake on said filters is removed by said compressed air jets and redeposited by gravity to the interior of the machine for subsequent recovery.

2. The combination of claim 9 wherein said fan means comprises an exhaust fan unit positioned adjacent said collector enclosure; manifold means mounted on said enclosure and communicating with the interiors of said filter elements; first duct means communicating with said manifold means and said exhaust fan unit; and second duct means communicating with said fan unit at one end and with the atmosphere at the other, adapted to pass filtered, clean air therethrough.

3. The combination of claim 2 wherein the filter elements are supported on frame means mounted on said manifold means, wherein said manifold means is positioned on a front sidewall of said collector enclosure and has a plurality of airtight service doors thereon to provide access to said filter elements.

4. The combination of claim 2 including at least one horizontally extending beam means attached at the top wall of said containment enclosure and having end portions extending outwardly beyond opposed side walls thereof and vertical support column means extending downwardly from each of the end portions of the horizontal beam and having lower end portions which are adapted to place a bearing weight of said dust containment system against a surface spaced from said machine housing.

5. The combination of claim 4 including bracket means associated with the horizontal beam means to permit attachment by a crane hook whereby said containment enclosure can be lifted.

6. The combination of claim 9 wherein the fan means and hollow filter elements comprise a plurality of self-contained air filter units each having an array of filter elements therein and a fan motor thereon communicating with each of said arrays;

said plurality of self-contained filter units mounted through a wall of said enclosure such that the arrays of filter elements are in communication with the interior of the machine and said fan motors include exhaust means communicating with an exterior portion of said enclosure.

7. The combination of claim 6 wherein the enclosure has three self-contained air filter units mounted thereon and is adapted to be fitted to a vibratory screening machine.

8. The combination of claim 6 wherein the exhaust means of the fan motors include duct means adapted to expel clean, filtered air to the atmosphere.

9. The combination of claim 1 wherein the fan means is adapted to create a negative draft at said inlet and outlet means of said machine, whereby, ambient air is drawn into said machine housing at said inlet and outlet means to prevent the escape of fugitive dust particles therefrom.

10. The combination of claim 9 wherein the machine is a rotary crusher/breaker and said means for treating and sizing the bulk material includes a rotatable drum having sized holes for the passage of sized bulk material therethrough and wherein said collector enclosure is fitted to said machine housing in a location above said rotatable drum.

11. The combination of claim 1 wherein the machine is a vibratory screening machine.

* * * * *